US012304199B2

(12) United States Patent
Murata et al.

(10) Patent No.: US 12,304,199 B2
(45) Date of Patent: *May 20, 2025

(54) SUPPLY DEVICE FOR ROLL MEDIUM AND RECORDING DEVICE

(71) Applicant: SEIKO EPSON CORPORATION, Tokyo (JP)

(72) Inventors: Mitsuru Murata, Matsumoto (JP); Keiichi Yato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 18/320,757

(22) Filed: May 19, 2023

(65) Prior Publication Data

US 2023/0294430 A1 Sep. 21, 2023

Related U.S. Application Data

(63) Continuation of application No. 17/445,982, filed on Aug. 26, 2021, now Pat. No. 11,691,444.

(30) Foreign Application Priority Data

Aug. 28, 2020 (JP) ................................ 2020-144252

(51) Int. Cl.

*B41J 15/04* (2006.01)
*B41J 11/00* (2006.01)
*B41J 3/60* (2006.01)

(52) U.S. Cl.

CPC ........... *B41J 15/042* (2013.01); *B41J 11/005* (2013.01); *B41J 3/60* (2013.01)

(58) Field of Classification Search

CPC ........ B41J 11/005; B41J 15/04; B41J 15/042; B65H 16/02; B65H 16/028; B65H 16/08; B65H 23/182; B65H 23/04; B65H 19/12

See application file for complete search history.

(56) References Cited

U.S. PATENT DOCUMENTS

| | | | | |
|---|---|---|---|---|
| 2006/0266863 A1* | 11/2006 | Takasu | G11B 23/107 242/348 |
| 2016/0136980 A1 | 5/2016 | Kobayashi et al. | |
| 2017/0326891 A1* | 11/2017 | Sekino | B41J 15/044 |
| 2018/0257405 A1 | 9/2018 | Masuda et al. | |

FOREIGN PATENT DOCUMENTS

| | | |
|---|---|---|
| JP | 2007-161382 A | 6/2007 |
| JP | 2016-104665 A | 6/2016 |

* cited by examiner

*Primary Examiner* — Leslie J Evanisko

(74) *Attorney, Agent, or Firm* — WORKMAN NYDEGGER

(57) ABSTRACT

A supply device for a roll medium includes a drawer-type lower holding unit configured to support a shaft of a roll medium to hold the roll medium, and a guide member configured to be pressed in a direction toward the shaft from below to come into contact with the roll medium held by the lower holding unit, and be displaced in accordance with a change in an outer diameter of the roll medium. In addition, the lower holding unit is configured to be drawn from a main body of the supply device in a first direction. When the lower holding unit, in a drawn-out state, is stored in the main body of the supply unit, the guide member comes into contact with the roll medium. The guide member is caused to be retracted downward from a travel path of the lower holding unit against a force pressing upward from below.

11 Claims, 11 Drawing Sheets

SUPPLY DEVICE FOR ROLL MEDIUM AND RECORDING DEVICE

The present application is a continuation of U.S. patent application Ser. No. 17/445,982, filed Aug. 26, 2021, which is based on, and claims priority from JP Application Serial Number 2020-144252, filed on Aug. 28, 2020, the disclosure of which is hereby incorporated by reference herein in its entirety.

BACKGROUND

1. Technical Field

The present invention relates to a supply device for a roll medium and a recording device including the supply device.

2. Related Art

There is a known recording device that includes a roll medium such as roll paper, and performs printing on a continuous sheet supplied from the roll medium.

For example, JP-A-2016-104665 discloses a printing device that includes two stages of roll paper provided in the vertical direction. In JP-A-2016-104665, the roll paper is mounted in a sheet supplying device provided in the printing device. The supplying device includes an arm member and a swing member provided at a leading end of the arm member, and is configured such that the roll paper is mounted at the arm member from the diagonally upward side. In addition, as illustrated in FIG. 4 of JP-A-2016-104665, the swing member at the leading end of the arm member extends substantially in the horizontal direction, and its leading end is illustrated as a sharp shape.

On the basis of the description in JP-A-2016-104665, it is expected that a user mounts a set of roll paper in the supply device. However, it is not easy to manually lift large and heavy roll paper, and it is desired to make this work more efficient. For example, it is considered that, by configuring a supply device at a lower stage so as to be a drawer type, it is possible to make the mounting of roll paper more efficient.

However, in a case where the supply device in JP-A-2016-104665 is configured as a drawer type, the roll paper may be damaged. Specifically, when the roll paper disposed on a drawer-type unit is moved horizontally to be stored in the supply device, the swing member at the leading end of the arm member comes into contact with the roller paper, which may possibly damage the roll paper.

SUMMARY

A supply device for a roll medium according to the present application includes a holding unit configured to support a shaft of a roll medium to hold the roll medium, and a guide member configured to be pressed in a direction toward the shaft from below to come into contact with the roll medium held by the holding unit, and be displaced in accordance with a change in an outer diameter of the roll medium, in which the holding unit is configured to be drawn from a supply device main body toward a first direction, the guide member comes into contact with the roll medium when the holding unit, in a drawn out state, is stored in the supply device main body, and the guide member is caused to be retracted downward from a travel path of the holding unit against a force pressing upward from below.

A recording device according to the present application includes a supply device and a recording unit configured to perform recording on a sheet pulled out from a roll medium, the supply device including a holding unit configured to support a shaft of the roll medium to hold the roll medium, a guide member configured to be pressed in a direction toward the shaft from below to come into contact with the roll medium held by the holding unit, and be displaced in accordance with a change in an outer diameter of the roll medium, and a paper feed path through which the sheet pulled out from the roll medium passes, in which the holding unit is configured to be drawn from a supply device main body toward a first direction, the guide member comes into contact with an outer periphery of the roll medium when the holding unit, in a drawn out state, is stored in the supply device main body, and the guide member is caused to be retracted downward from a travel path of the holding unit against a force pressing upward from below and.

DESCRIPTION OF EXEMPLARY EMBODIMENTS

First Embodiment

Overview of Recording Device

Figure 1:
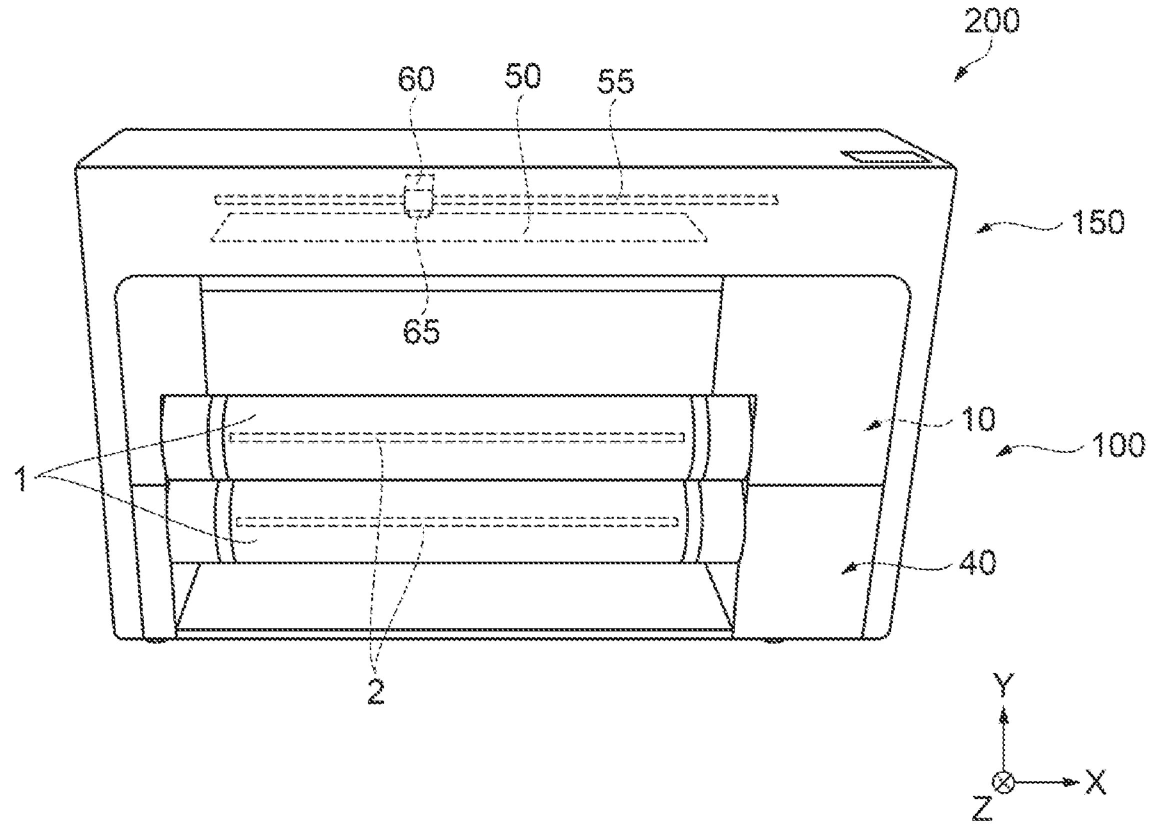
FIG. 1 is a perspective view illustrating a recording device according to a first embodiment as viewed from the front and above.

FIG. 1 is a perspective view illustrating a recording device as viewed from the front and above.

A recording device 200 according to the present application is a large-format ink jet-type printer configured to rotatably hold a roll medium 1 in which a sheet is wound around a core member, and discharge an ink onto a front surface of the sheet pulled out from the roll medium 1 to perform printing. The large-format printer is a printer that can perform printing recording on a sheet having a large size such as a sheet having a short-side width of A0 (841 mm).

The roll medium 1 is roll paper in which a sheet is wound around a core member having a tubular shape, and has a plurality of sizes. In addition, for the sheet, it may be possible to use paper, a resin film, a woven fabric, or a sheet member obtained by combining these items.

As illustrated in FIG. 1, the recording device 200 includes, for example, a recording unit 150 and a supply device 100. The recording device 200 has a substantially cuboid shape, and a configuration in which the supply device 100 and the recording unit 150 are stacked on top of each other. The supply device 100 is a paper feed unit in which two sets of roll media 1 are mounted. Note that the X-axis direction represents a direction in which a shaft 2 serving as a rotary shaft of the roll medium 1 extends, and the Y-axis direction represents a direction in which the roll media 1 are stacked. In addition, the Z-axis direction represents a depth direction of the recording device 200. The length of the recording device 200 in the X-axis direction may be referred to as a width. The tip side of the arrow of the X-axis may be referred to as a right side. The base end side of the arrow of the X-axis may be referred to as a left side. Similarly, the length of the recording device 200 in the Y-axis direction may be referred to as a height. The tip side of the arrow of the Y-axis may be referred to as an upper side. The base end side of the arrow of the Y-axis may be referred to as a lower side. In addition, the side at which a user stands at a position that faces the recording device 200 to mount a roll medium in the supply device 100 is the base end side of the arrow of the Z-axis, and is referred to as a drawing direction. The storage direction opposite to this side is the tip side of the arrow of the Z-axis. Note that the drawing direction may be upstream and the storage direction may be downstream. This similarly applies to other drawings.

As illustrated in FIG. 1, the recording unit 150 includes, for example, a support 50, a guiding portion 55, a carriage 60, and a recording head 65.

The support 50 is disposed substantially at the center of the inside of the recording unit 150, and is a plate member that extends in the width direction. The guiding portion 55 is a rod-shaped or sheet-shaped member that is supported at the rear face and diagonally upward from the support 50, and extends in the width direction. The guiding portion 55 supports the carriage 60 in a movable manner. The carriage 60 is configured to be able to reciprocate along the guiding portion 55 in the width direction with a drive motor, which is not illustrated, or a drive belt. The recording head 65 is mounted on the carriage 60. The recording head 65 is disposed such that a plurality of ink discharging holes (not illustrated) are directed toward the support 50 side. The recording head 65 is configured to perform recording by discharging an ink onto a sheet supported by the support 50.

Figure 2:
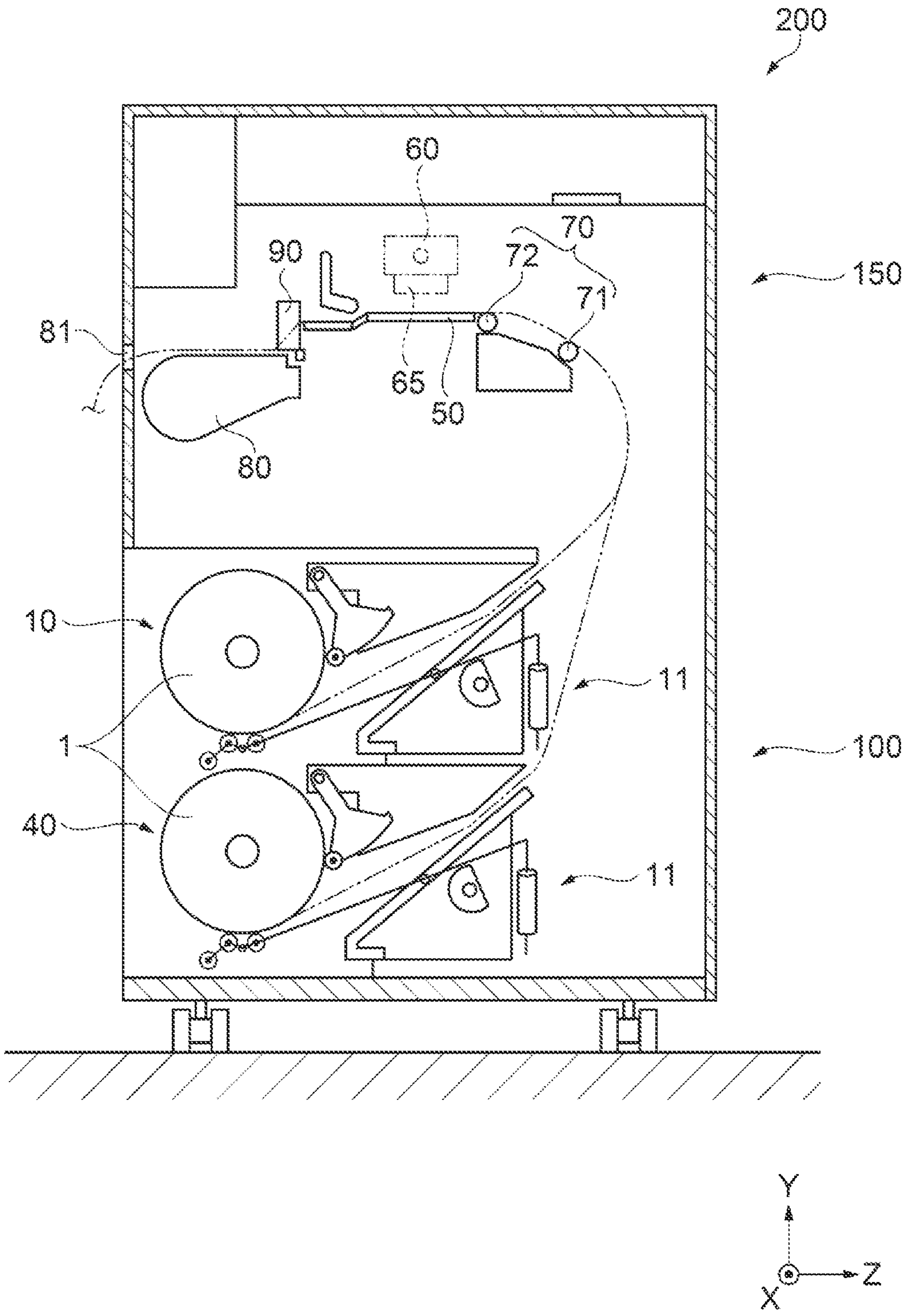
FIG. 2 is a cross-sectional view illustrating a side of the recording device.

FIG. 2 is a side cross-sectional view illustrating a recording device.

As illustrated in FIG. 2, the recording unit 150 is configured to further include, for example, a transport unit 70, a paper discharge support 80, and a cutting portion 90.

The transport unit 70 includes, for example, an intermediate roller 71 and a transport roller 72.

The intermediate roller 71 and the transport roller 72 support a sheet supplied from the supply device 100 disposed below to transport the sheet to the support 50. The intermediate roller 71 and the transport roller 72 each include a roller shaft extending along the width direction. This roller shaft is connected to a drive motor (not illustrated) so as to be able to drive rotation of the intermediate roller 71 and the transport roller 72. The intermediate roller 71 and the transport roller 72 each include a paired driven roller (not illustrated) to sandwich the front surface and the back surface of a sheet using respective roller pairs and transport it.

The paper discharge support 80 is disposed downstream of the support 50. The paper discharge support 80 supports a sheet that has passed through the support 50, and also guides the sheet to a paper discharge port 81 formed in the front face of the recording device 200. The cutting portion 90 cuts a sheet at a given length with control by a control unit (not illustrated) provided within the recording device 200. The sheet that has been cut by the cutting portion 90 is discharged from the paper discharge port 81.

Note that the recording unit 150 is configured as an ink jet-type in the description above. However, the recording unit 150 may be configured as other printing types. For example, it may be possible to employ an electrophotographic recording unit 150 including a photoconductive drum.

Overview of Supply Device

As illustrated in FIG. 2, the supply device 100 according to the present application has an up-down two-stage structure including an upper holding unit 10 and a lower holding unit 40. The lower holding unit 40 is configured as a drawer type.

The supply device 100 includes, for example, the upper holding unit 10, the lower holding unit 40, and upper and lower paper feed units 11 configured so as to be able to independently supply a sheet to the recording unit 150.

Note that in the description of this embodiment, the supply device 100 includes two stages of upper and lower holding units. However, the supply device 100 may be configured to have only one stage of the lower holding unit 40.

Description will be made with reference to FIG. 1 again.

The upper holding unit 10 is disposed at the upper stage in the supply device 100. The roll medium 1 is mounted into the upper holding unit 10 in a manner such that a user installs the roll medium 1 directly from diagonally upwards.

The lower holding unit 40 is configured as a drawer type. Thus, at the time of mounting the roll medium 1, the lower holding unit 40 can be drawn out by holding a handle portion, not illustrated, disposed at the lower portion of the lower holding unit 40 to pull it toward the user.

Figure 3:
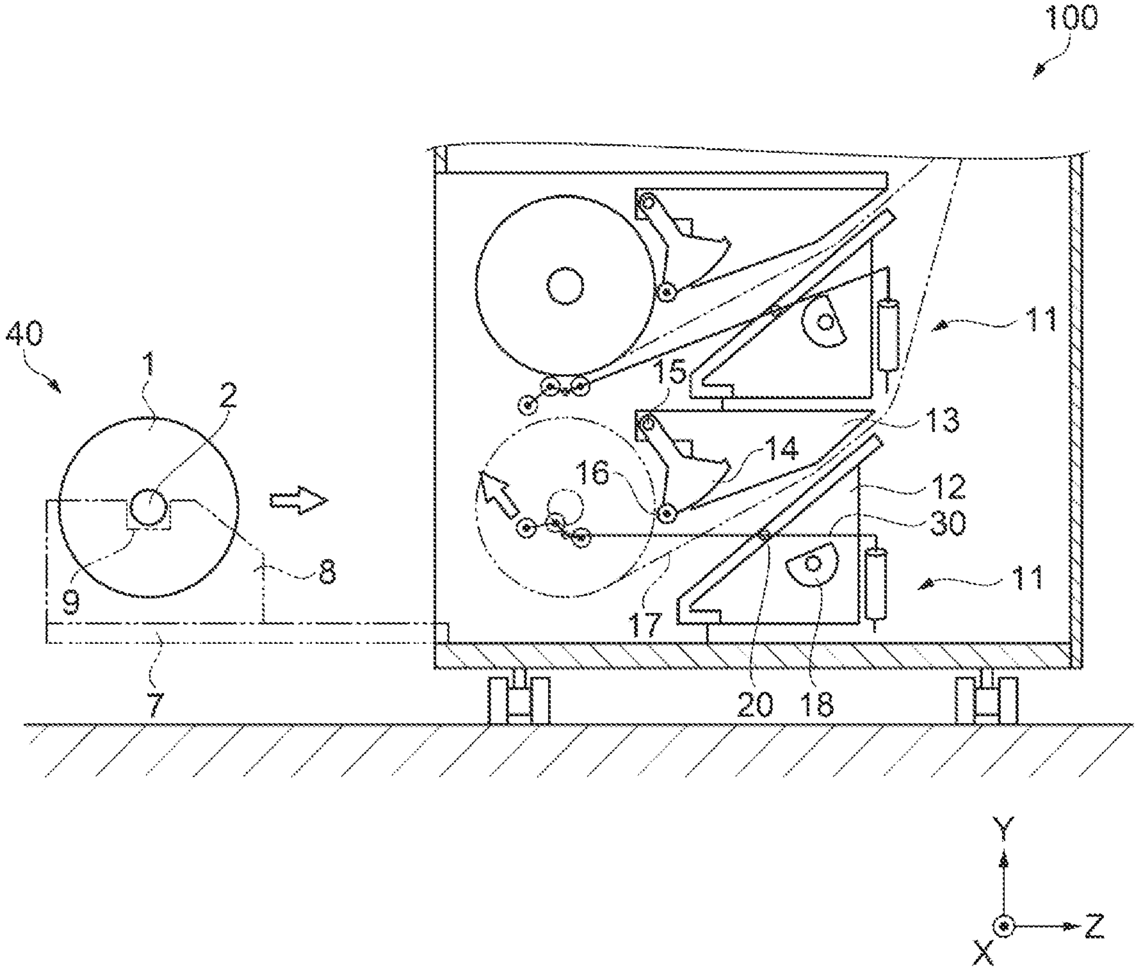
FIG. 3 is an enlarged view illustrating the supply device in FIG. 2 and is a diagram illustrating a state where a lower holding unit is drawn.

FIG. 3 is an enlarged view illustrating the supply device in FIG. 2, and illustrates a state where the lower holding unit is drawn out.

As illustrated in the drawn-out state in FIG. 3, the lower holding unit 40 includes, for example, a base portion 7, a pair of bearing portions 8, and a rail (not illustrated). The lower holding unit 40 is a portion that supports the shaft 2 of the roll medium 1 to hold the roll medium 1. Note that the drawing direction and the storage direction of the lower holding unit 40 are also referred to as a first direction. In other words, the first direction is a horizontal direction extending from the front face of the supply device 100.

The base portion 7 is a rectangular plate member that forms a bottom surface of the lower holding unit 40.

The bearing portions 8 are plate members that stand from left and right end portions of the base portion 7 and have left-right symmetry. The pair of bearing portions 8 each have a cutout portion 9 at and around the center of the upper surface portion. This cutout portion 9 supports the shaft 2 of the roll medium 1 to hold the roll medium 1. A rail (not illustrated) extending in the Z-axis direction is provided at the end surface of the base portion 7 in the width direction, and slides with a rail receiving portion (not illustrated) provided at a corresponding position in the main body of the supply device 100. This enables the lower holding unit 40 to be drawn out and be stored. In addition, when the lower holding unit 40 is in the stored state, the shaft 2 of the roll medium 1 is coupled to a drive mechanism 3 provided in the main body of the supply device 100, which makes it possible to drive the roll mechanism 1 to rotate in a normal direction or reverse direction.

Each of the paper feed units 11 includes, for example, a lower path member 12, an upper path member 13, a separating flapper 14, a cam member 18, and a guide member 30.

As illustrated in FIG. 3, the lower path member 12 is a supporting member that supports a sheet that has been pulled out from the roll medium 1, from a back surface of the sheet. The lower path member 12 is a member that constitutes a paper feed path 17 used to transfer a sheet to the transport unit 70 (FIG. 2). The upper surface of the lower path member 12 is sloped diagonally upward in the depth direction. In addition, a cam member 18 used to drive the guide member 30 or the like is provided within a plate member of the lower path member 12. Furthermore, a receiving portion for a first rotational movement shaft 20 that engages with the fulcrum of the guide member 30 is provided at or near the center of the upper surface of the lower path member 12.

The upper path member 13 is a member that is paired with the lower path member 12 and constitutes the paper feed path 17. The lower surface of the upper path member 13 is sloped diagonally upward in the depth direction and along the upper surface of the lower path member 12. The sheet that has been pulled out from the roll medium 1 passes through the paper feed path 17, and then is handed over to the transport unit 70 (FIG. 2) disposed upward. A receiving portion for a third rotational movement shaft 15 is provided at an end portion of the upper path member 13 at the roll medium 1 side, and engages with the separating flapper 14.

The separating flapper 14 is an anchor-shaped member that lightly presses the roll medium 1 with a torsion spring, which is not illustrated. The separating flapper 14 is able to rotate with the third rotational movement shaft 15 being the fulcrum. In addition, a roller 16 is provided at an end portion of the separating flapper 14 that is closer to the roll medium 1. The separating flapper 14 is used for an operation for loading the roll medium 1. The operation for loading the roll medium 1 will be described later.

Guide Member

Figure 4:
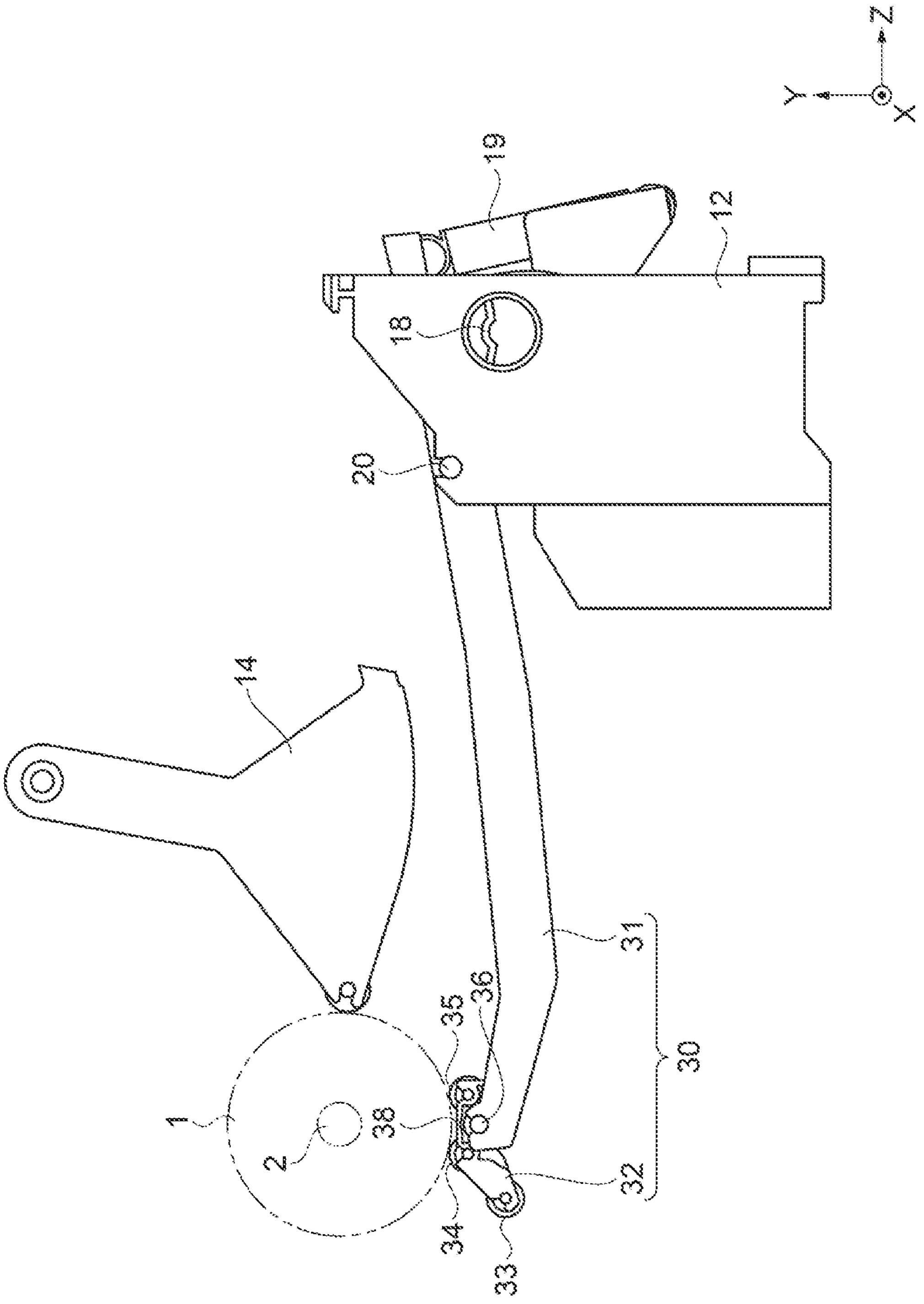
FIG. 4 is a side view illustrating an overview of a guide member.

FIG. 4 is a side view illustrating an overview of a guide member.

The guide member 30 is a guiding member used for the roll medium 1 and includes an arm portion 31, a swing portion 32, and the like.

As illustrated in FIG. 4, the arm portion 31 is a bar-shaped member configured to vertically swing in a seesaw manner with the first rotational movement shaft 20 being the fulcrum. The first rotational movement shaft 20 provided at the arm portion 31 engages with the receiving portion for the first rotational movement shaft 20, the receiving portion being provided at the upper portion of the lower path member 12.

In the initial state prior to mounting the roll medium 1, the arm portion 31 extends with the first rotational movement shaft 20 being the fulcrum in a manner such that a portion thereof at the upstream side is longer and a portion at the downstream side is shorter. A bent portion that is slightly bent toward the lower side is provided upstream of the arm portion 31 in order to facilitate supporting the roll medium 1. An end portion of the arm portion 31 at the downstream side is referred to as one end, and an end portion at the upstream side is referred to as the other end. Note that the other end is also referred to as a leading end.

A coil spring 19 is connected at the one end of the arm portion 31 at the downstream side. The coil spring 19 is coupled to the cam member 18 provided within the lower path member 12, and is configured such that the position of the leading end of the arm portion 31 can move vertically in response to rotation of the cam member 18. In other words, the guide member 30 is pressed from below in a direction toward the shaft 2 and is brought into contact with the roll medium 1 held by the lower holding unit 40. In addition, the guide member 30 is provided so as to be displaced in accordance with a change in the outer diameter of the roll medium 1.

Figure 5:
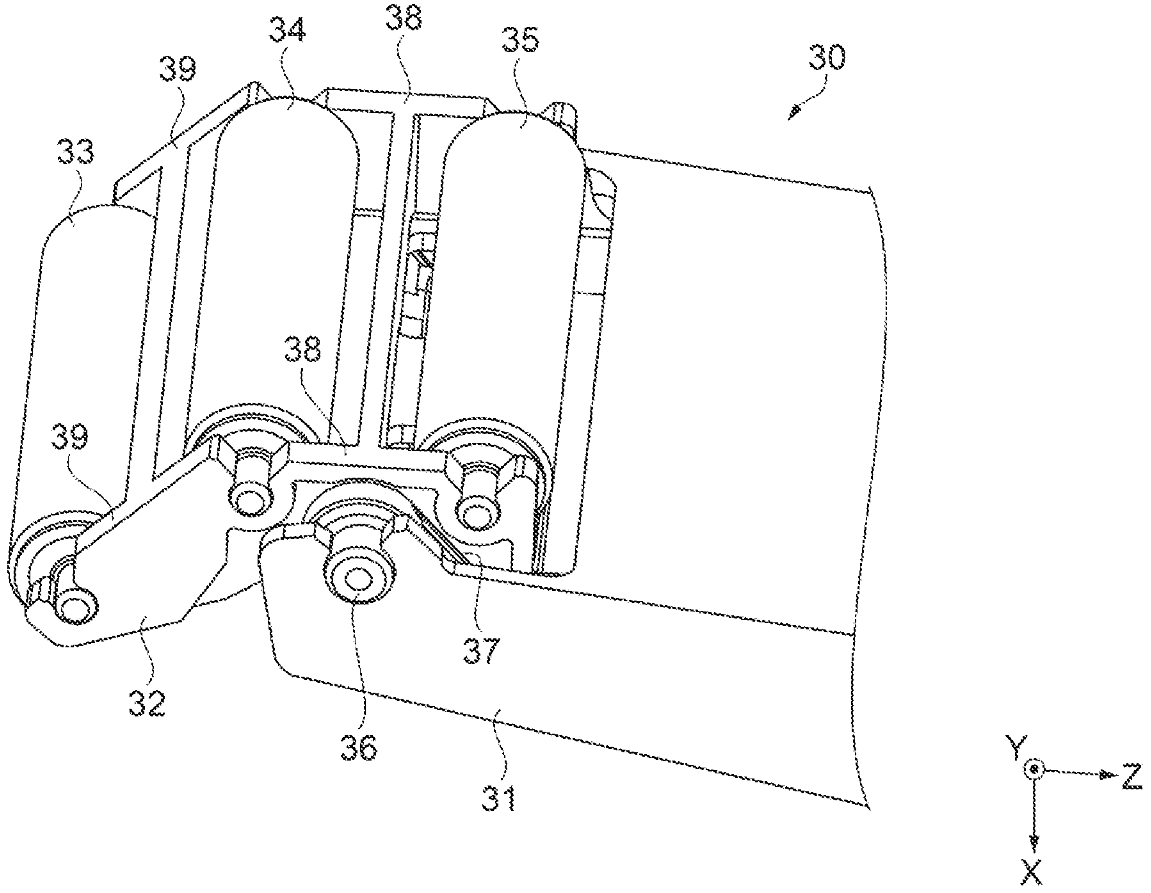
FIG. 5 is an enlarged perspective view illustrating a swing portion.

FIG. 5 is an enlarged perspective view illustrating a swing portion.

The swing portion 32 is provided at the leading end of the arm portion 31. The swing portion 32 is a lure member for the roll medium 1, and has a leading end provided so as to protrude from the leading end of the arm portion 31.

The swing portion 32 includes, for example, a first roller 33, two second rollers 34 and 35, and a torsion spring 37.

The swing portion 32 is a gable-roof-shaped member having a first side 38 disposed at the downstream side and a second side 39 extending downward toward the upstream side from the first side 38. The first side 38 extends substantially in the horizontal direction. The second side 39 extends downward toward the upstream side so as to be angled at approximately 30 degrees relative to the horizontal direction.

The second roller 34 is provided at an end portion of the first side 38 at the upstream side of the swing portion 32. The second roller 35 is provided at an end portion of the first side 38 at the downstream side. In other words, the second rollers 34 and 35 are each provided at a corresponding end of the first side 38. A second rotational movement shaft 36 extending in the width direction is provided at the center of the first side 38 of the swing portion 32. In other words, the second rotational movement shaft 36 is disposed between the two second rollers 34 and 35. Furthermore, the second rotational movement shaft 36 engages with a receiving portion for the second rotational movement shaft 36, the receiving portion being provided at a tip side of the arm portion 31. The swing portion 32 is rotatably provided with the second rotational movement shaft 36 being the fulcrum. Note that it may be possible to employ a configuration in which only one second roller is provided.

The first roller 33 is provided at an end portion of the second side 39 at the upstream side of the swing portion 32.

In a preferred example, the arm portion 31 and the main body of the swing portion 32 are made of resin. For example, an ABS resin or polycarbonate resin is used. Note that a metal may be used. In addition, in a preferred example, a resin roller is used as the first roller 33. For example, a roller made of polyacetal resin is used. Note that it is only necessary for the material to have a high sliding property and not damage paper. For example, it may be possible to use a rubber or an elastomer. This similarly applies to the second rollers 34 and 35. Note that, although detailed description will be made later, the reason that the arm portion 31 is made of a resin is that, since a plurality of arm portions (guide members) are provided along the width of the sheet, this configuration allows loads to be dispersed.

In a preferred example, the diameter of the first roller 33 is set to approximately 15 mm, and the length is set to approximately 5 cm. This similarly applies to the second rollers 34 and 35.

Figure 6:
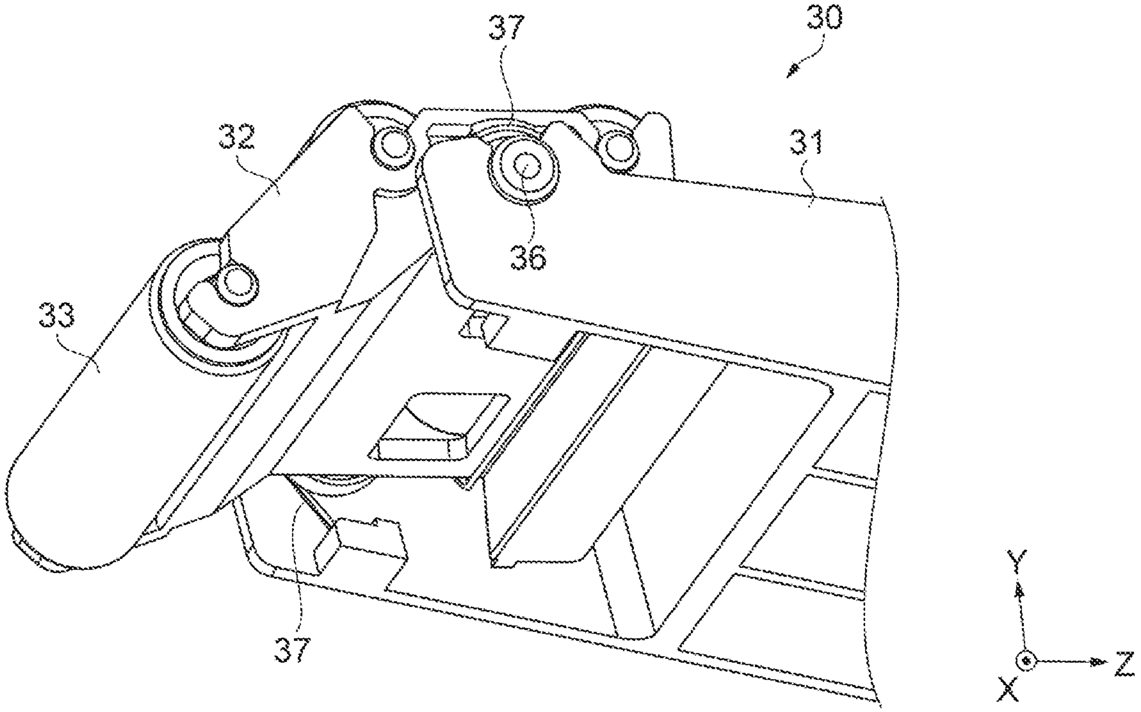
FIG. 6 is a perspective view illustrating the swing portion as viewed from below.

FIG. 6 is a perspective view of the swing portion as viewed from below.

The back surface of the swing portion 32 includes a torsion spring 37 serving as an urging portion that presses downward a side, with respect to the second rotational movement shaft 36, of the swing portion 32, the side being a side at which the first roller 33 is disposed. The torsion spring 37 is configured such that the center of the torsion spring 37 is inserted into each of both ends of the second rotational movement shaft 36. In addition, both ends of the torsion spring 37 are respectively fixed at a lock rib having an L-shape and provided inside of the arm portion 31.

Description will be made with reference to FIG. 4 again.

Such a swing portion 32 engages with the other end side of the arm portion 31 and swings in a seesaw manner with the second rotational movement shaft 36 being the fulcrum. In a process of storing the lower holding unit 40, the roll medium 1 first comes into contact with the first roller 33. As the roll medium 1 comes into contact with the first roller 33, the swing portion 32 moves in a direction in which the first roller 33 is pressed further downward, with the second rotational movement shaft 36 being the fulcrum. At this time, the reaction force of the torsion spring 37 acts in a direction in which the roll medium 1 is pushed upward.

Then, when a pressing-down force that cannot be fully absorbed only by the movement of the swing portion 32 is applied, the entire guide member 30 moves downward. Specifically, the swing portion 32 comes into contact with the roll medium 1, and resists a force pressing upward from below by the coil spring 19. The tip side of the swing portion 32 rotates downward with the first rotational movement shaft 20 being the fulcrum, whereby the guide member 30 is caused to be retracted downward from the travel path of the lower holding unit 40. In other words, as the guide member 30 comes into contact with the roll medium 1 to cause the swing portion 32 and the arm portion 31 to swing, the guide member 30 moves so that the roll medium 1 is accommodated above the first side 38 of the swing portion 32. Then, when the lower holding unit 40 is in the stored state, the two second rollers 34 and 35 are in contact with the outer periphery of the roller medium 1. In other words, in the stored state, the roll medium 1 is mounted above the two second rollers 34 and 35. Note that it is only necessary that at least one second roller be in contact with the outer periphery of the roll medium 1.

Figure 7:
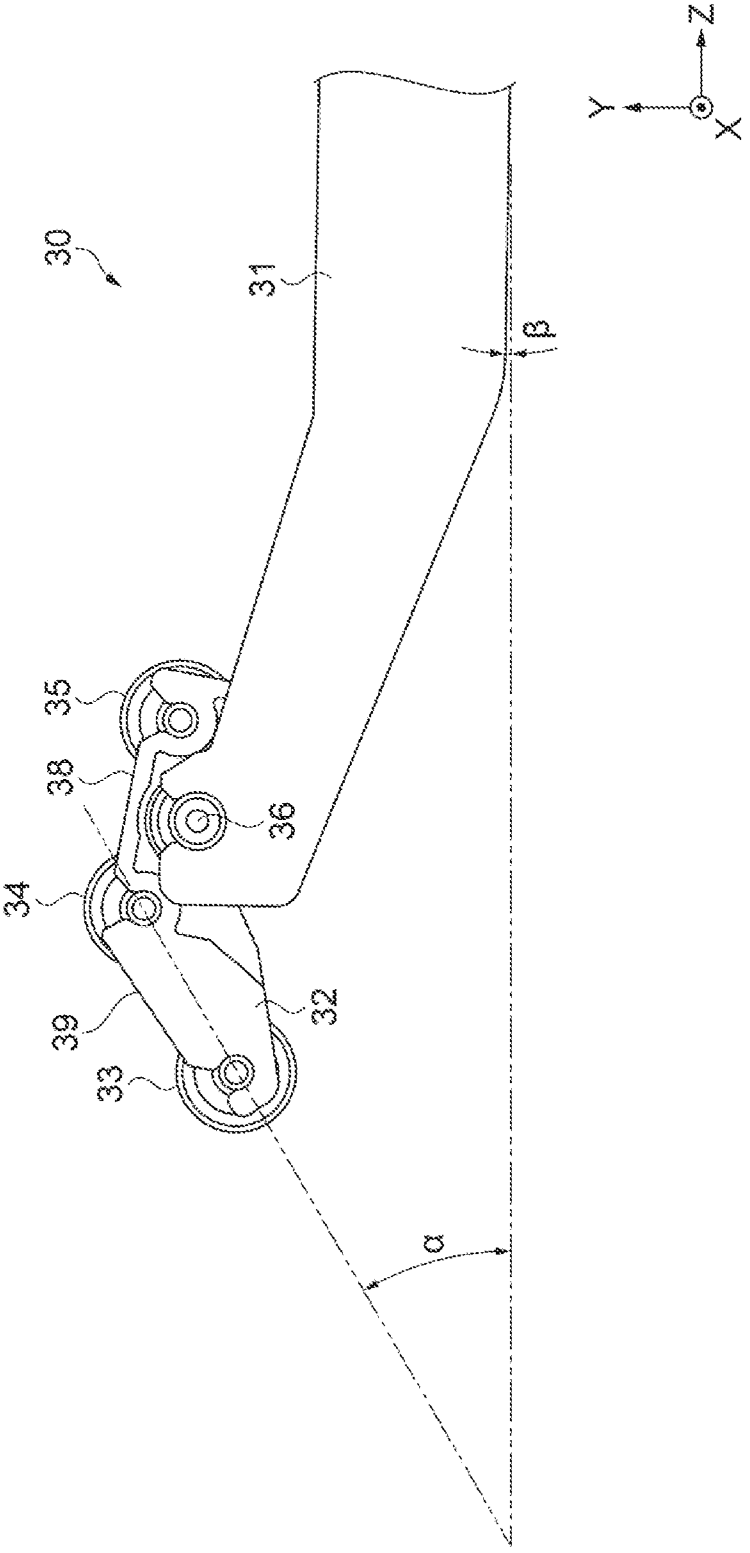
FIG. 7 is an enlarged view illustrating the swing portion and its surroundings in FIG. 4.

FIG. 7 is an enlarged view illustrating the swing portion in FIG. 4 and its surroundings.

FIG. 7 is a diagram illustrating a state of the swing portion 32 when a portion of the arm portion 31 that extends downstream of the bent portion is substantially horizontal.

As illustrated in FIG. 7, the line connecting the center of the rotary shaft of the first roller 33 of the swing portion 32 and the center of the rotary shaft of the second roller 34 intersects the Z-axis direction at an angle $\alpha$. In a preferred example, the angle $\alpha$ is set to approximately 30 degrees. In addition, the angle $\beta$ formed by the Z-axis direction and the portion of the arm portion 31 that extends downstream of the bent portion is set to substantially 1 degree.

In FIG. 7, while the entire swing portion 32 is in a state of being lifted upward as compared with that illustrated in FIG. 4, the first roller 33 is disposed lower than the second rollers 34 and 35. In other words, when the first roller 33 is not in contact with the roll medium 1, the first roller 33 is disposed lower than the second rollers 34 and 35.

Figure 8:
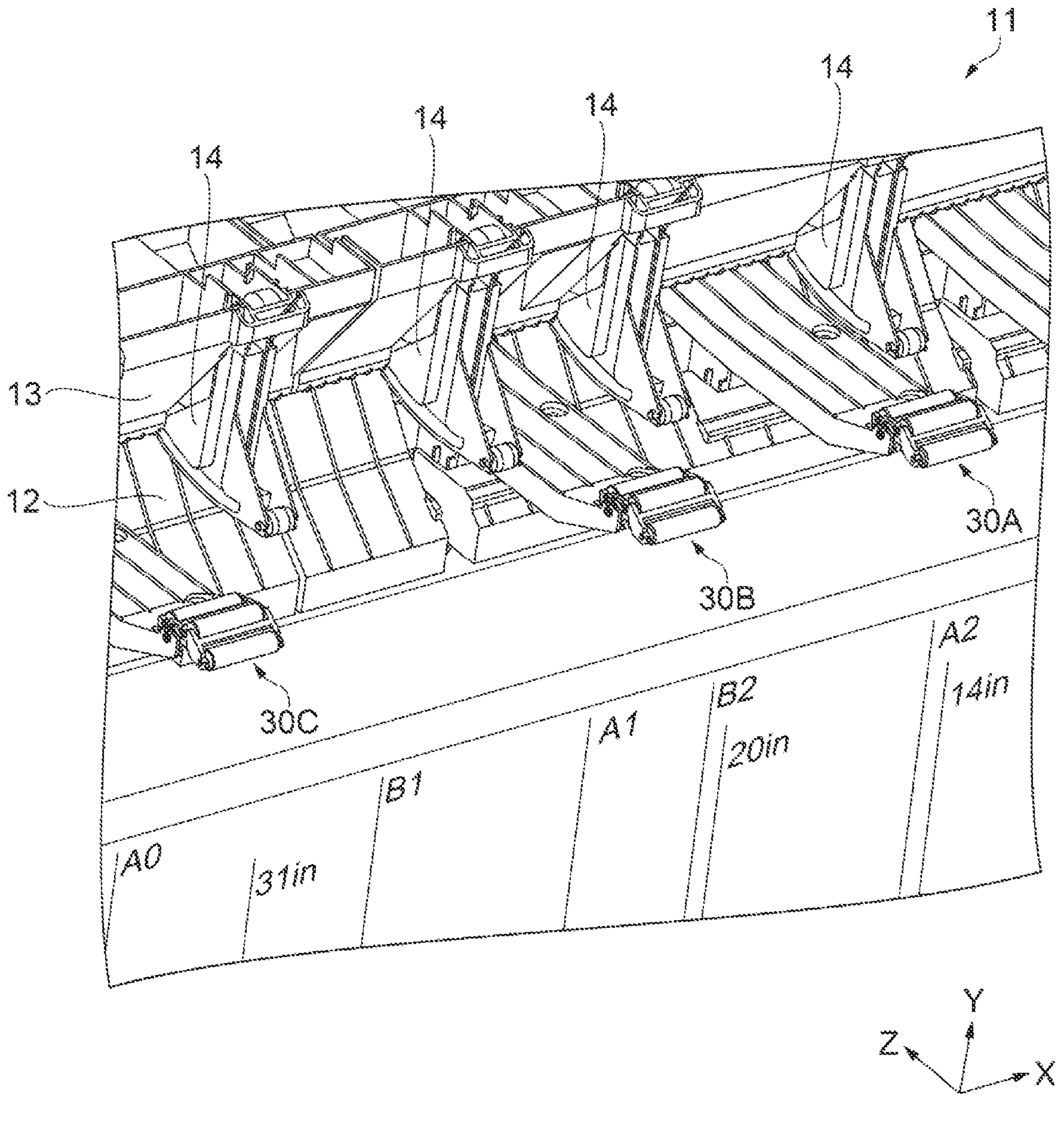
FIG. 8 is a perspective view illustrating a paper feed unit and its surroundings within a supply device as viewed from the front face in a state where the lower holding unit is drawn.

FIG. 8 is a perspective view illustrating the paper feed unit and its surroundings within the supply device as viewed from the front face in a state where the lower holding unit is drawn out.

As illustrated in FIG. 8, the paper feed unit 11 includes a plurality of guide members. Note that, in order to distinguish individual guide members, these guide members are denoted as guide members 30A, 30B, and 30C. The reason that a plurality of guide members are provided is that various sizes of roll medium 1 can be stored. The supply device 100 has specifications in which the device can store a roll medium 1 having a sheet width ranging from 10 inches to 44 inches and a diameter ranging from approximately 10.3 cm to 17 cm. Note that the size is not limited to these sizes. It may be possible to use a roll medium 1 that falls outside the dimensions described above.

As illustrated in FIG. 8, the guide member 30A is disposed at a position approximately 14 inches in distance from a position (reference position) of a flange (not illustrated) attached at a right end surface of the roll medium 1. In addition, the guide member 30B is disposed at a position of approximately 20 inches, and the guide member 30C is disposed at a position of approximately 31 inches. In this manner, the plurality of guide members are provided so as to be dense at a side closer to the reference position and be sparse at a side away from the reference position. Note that, although illustration is not given, a guide member is also provided at the left side of the guide member 30C and at the right side of the guide member 30A, and with this configuration, in a case of roll media 1 having various sheet widths, it is possible to support at least both ends thereof. Such a configuration makes it possible to store a roll medium 1 having a sheet width ranging from 10 inches to 44 inches.

Figure 9:
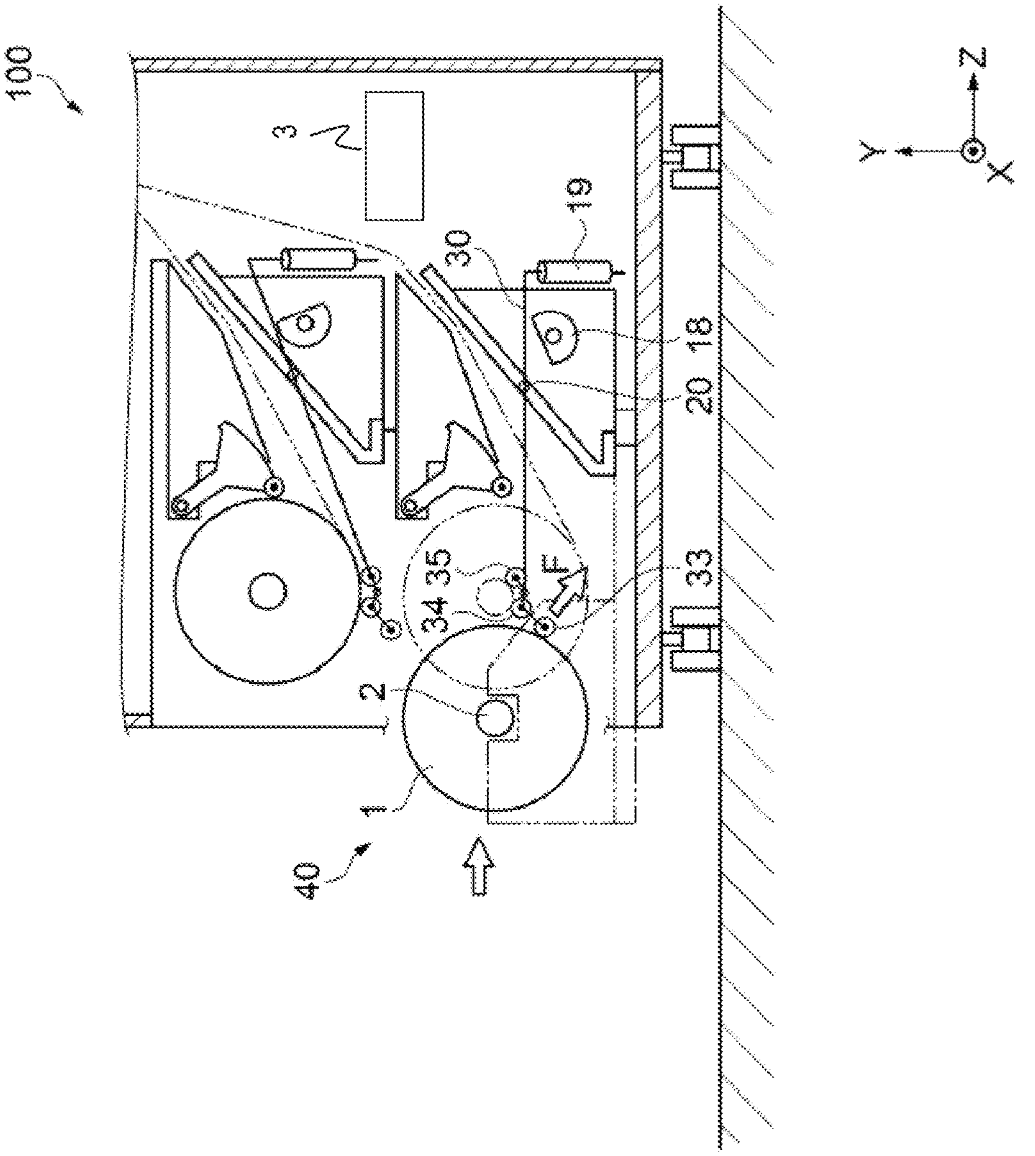
FIG. 9 is a diagram illustrating an operation state of a guide member at the time of storing a roll medium.

FIG. 9 is a diagram illustrating an operation state of the guide member at the time of storing a roll medium, and corresponds to FIG. 3. FIG. 9 illustrates a storage process in which the lower holding unit 40 is stored within the supply device 100 from the state illustrated in FIG. 3.

When the lower holding unit 40 that has been drawn is stored in the main body of the supply device 100, the guide member 30 comes into contact with the roll medium 1, and resists a force pressing upward from below to be retracted downward from the travel path of the lower holding unit 40 as indicated by the arrow F. At this time, the first roller 33 first comes into contact with the roll medium 1 at a position lower than the height of the shaft 2 of the roll medium 1, and the guide member 30 rotates with the first rotational movement shaft 20 disposed downstream in the first direction being the fulcrum, to be retracted.

Then, in a state where the lower holding unit 40 is stored, the roll medium 1 is mounted above the two second rollers 34 and 35 so as to be able to vertically rotate.

Note that description has been made of the lower holding unit 40 configured as a drawer type. However, it may be possible that the upper holding unit 10 is also configured as a drawer type. In other words, all the plurality of holding units disposed in the vertical direction may be configured as a drawer type. Alternatively, it may be possible to employ a configuration in which at least holding units disposed lower than the uppermost stage can be drawn out.

As described above, with the supply device 100 for the roll medium 1 and the recording device 200 including the supply device 100 according to this embodiment, it is possible to obtain the following effects.

The supply device 100 for the roll medium 1 includes: the lower holding unit 40 configured to support the shaft 2 of the roll medium 1 to hold the roll medium 1; and the guide member 30 configured to be pressed in a direction toward the shaft 2 from below to come into contact with the roll medium 1 held by the lower holding unit 40, and be displaced in accordance with a change in the outer diameter of the roll medium 1. In addition, the lower holding unit 40 is able to be drawn from the main body of the supply device 100 in the first direction. When the lower holding unit 40 that has been drawn out is stored in the supply device main body, the guide member 30 comes into contact with the roll medium 1. Then, the guide member 30 is caused to be retracted downward from the travel path of the lower holding unit 40 against a force pressing upward from below.

With this supply device 100, when the lower holding unit 40 in which the roll medium 1 has been mounted is stored, the guide member 30 is retracted downward from the travel path of the lower holding unit 40. This makes it possible to suppress occurrence of damage on the roll medium 1 due to the roll medium 1 hitting the guide member 30.

When the drawing direction in the first direction is set as upstream and the storage direction is set as downstream, the supply device 100 for the roll medium 1 is configured such that the guide member 30 rotates with the first rotational movement shaft 20 disposed downstream in the first direction being the fulcrum, and is retracted.

With this supply device 100, the guide member 30 rotates with the first rotational movement shaft 20 being the fulcrum, to be retracted. This makes it possible to suppress occurrence of damage on the roll medium 1 due to the roll medium 1 hitting the guide member 30.

The guide member 30 is configured to include the arm portion 31 and the swing portion 32. The arm portion 31 has one end disposed at the downstream side of the first rotational movement shaft 20. The swing portion 32 is provided at the other end side of the arm portion 31.

With this configuration, the guide member 30 is configured to include the arm portion 31 and the swing portion 32, which makes it possible to alleviate the impact on the roll medium at the time of contact.

The swing portion 32 includes the first roller 33 configured to come into contact with the roll medium 1 in the process of storing the lower holding unit 40, and also includes at least one second roller that comes into contact with the roll medium 1 on the lower holding unit 40 that has been stored.

With this configuration, in the process of storing the lower holding unit 40, the first roller 33 first comes into contact with the roll medium 1 and the first roller 33 rotates. This makes it possible to alleviate the impact on the roll medium 1 at the time of contact. In addition, the first roller 33 is made of a resin, which makes it possible to further suppress the occurrence of damage on the roll medium 1 at the time of contact.

In the swing portion 32, the first roller 33 is disposed upstream of the second rollers 34 and 35. In the process of storing the lower holding unit 40, the first roller 33 comes into contact with the roll medium 1 at a position lower than the height of the shaft 2 of the roll medium 1.

With this configuration, in the process of storing the lower holding unit 40, the first roller 33 comes into contact with a lower side of the roller medium 1 than the center of the roll medium 1. Thus, due to rotation of the first roller 33, the guide member 30 smoothly retracts downward.

The swing portion 32 disposed at the other end side of the arm portion 31 includes the second rotational movement shaft 36. The swing portion 32 is rotatably provided with the second rotational movement shaft 36 being the fulcrum.

With this configuration, as the swing portion 32 is configured to be able to rotate with the second rotational movement shaft 36 being the fulcrum, the guide member 30 more smoothly retracts downward.

Two second rollers 34 and 35 are provided. The second rotational movement shaft 36 is disposed between the two second rollers 34 and 35. In a state where the lower holding unit 40 is stored, the two second rollers 34 and 35 are in contact with the outer periphery of the roll medium 1.

With this configuration, in a state where the lower holding unit 40 is stored, it is possible to rotatably support the roll medium 1 by using the two second rollers 34 and 35.

The swing portion 32 includes the torsion spring 37 serving as an urging portion that presses downward a side, with respect to the second rotational movement shaft 36, of the swing portion 32, the side being a side at which the first roller 33 is disposed.

With this configuration, when the first roller 33 comes into contact with the roll medium 1, a force acting in a direction in which the roll medium 1 is pushed upward is generated by the torsion spring 37. Thus, the guide member 30 smoothly retracts downward.

When the first roller 33 is not in contact with the roll medium 1, the first roller 33 is disposed lower than the second rollers 34 and 35.

With this configuration, at the time of contact with the roll medium 1, it is possible to cause the first roller 33 to come into contact with the lower side of the roll medium 1 than the center of the roll medium 1.

The shaft 2 of the roll medium 1 is configured to be driven by being coupled to the drive mechanism 3 when the lower holding unit 40 is in the stored state. With this configuration, in a state where the lower holding unit 40 is stored, it is possible to use the drive mechanism 3 to perform paper feed of a sheet pulled out from the roll medium 1.

In the supply device 100 for the roll medium 1, a plurality of holding units are disposed in the vertical direction, and at least lower holding units 40 disposed lower than the uppermost stage can be drawn out.

With this supply device 100, the roll medium 1 can be easily mounted in the lower holding unit 40.

The recording device 200 includes the supply device 100 and the recording unit 150 configured to perform recording on a sheet pulled out from the roll medium 1. The supply device 100 includes: the lower holding unit 40 configured to support the shaft 2 of the roll medium 1 to hold the roll medium 1; the guide member 30 configured to be pressed in a direction toward the shaft 2 from below to come into contact with the roll medium 1 held by the lower holding unit 40, and be displaced in accordance with a change in an outer diameter of the roll medium 1; and the paper feed path 17 through which the sheet pulled out from the roll medium 1 passes. In the recording device 200, the lower holding unit 40 is configured to be drawn from the main body of the supply device 100, the guide member 30 comes into contact with an outer periphery of the roll medium 1 when the lower holding unit 40, in a drawn-out state, is stored in the main body of the supply device 100, and the guide member 30 resists a force pressing upward from below and is caused to be retracted downward from a travel path of the lower holding unit 40.

With the recording device 200, at the time of storing the lower holding unit 40 on which the roll medium 1 has been mounted, the guide member 30 is retracted downward from the travel path of the lower holding unit 40. This makes it possible to suppress occurrence of damage on the roll medium 1 due to the roll medium 1 hitting the guide member 30.

Second Embodiment

Operation of Loading Roll Medium

Figure 10:
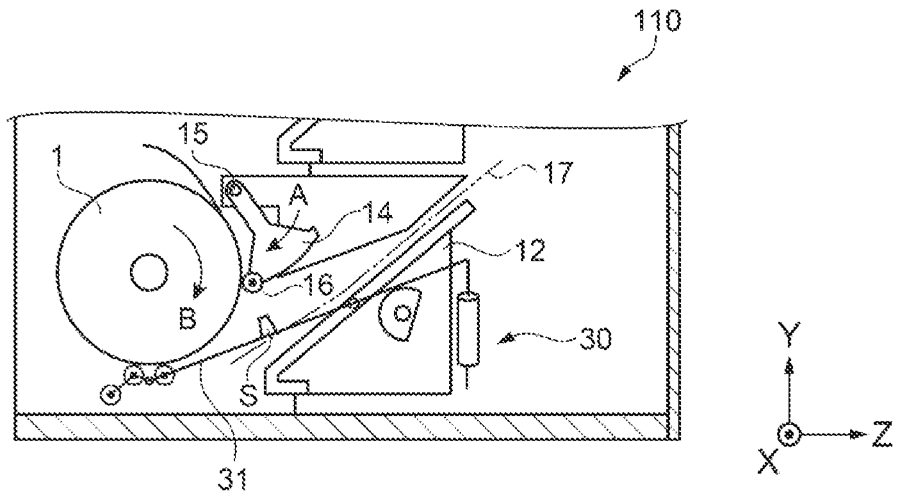
FIG. 10 is a side cross-sectional view used to explain a first operation for loading a roll medium according to a second embodiment.
Figure 11:
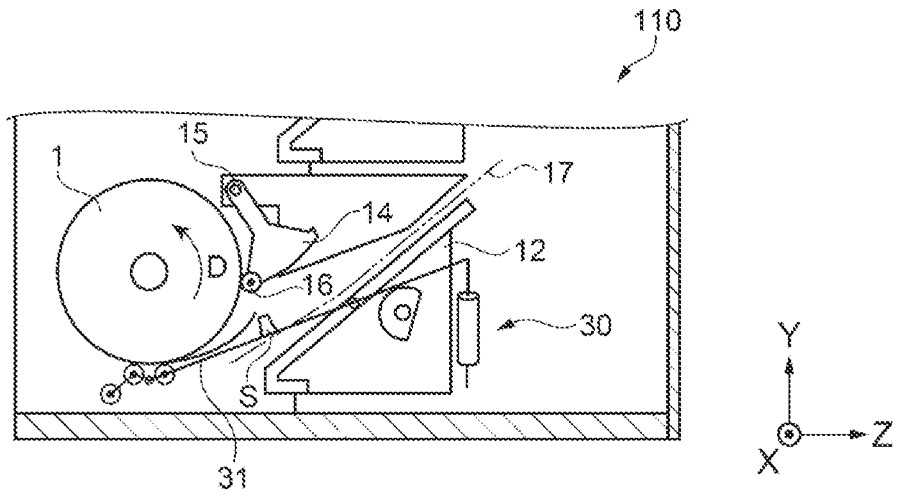
FIG. 11 is a side cross-sectional view used to explain a second operation for loading a roll medium.
Figure 12:
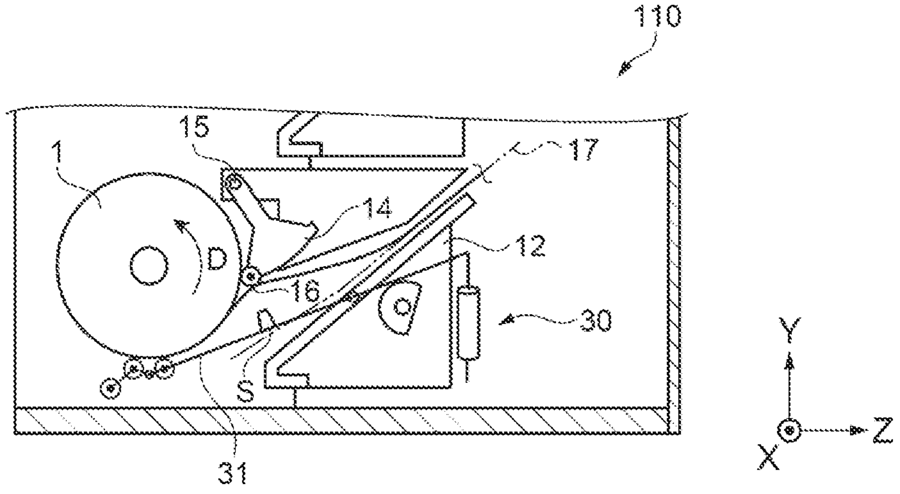
FIG. 12 is a side cross-sectional view used to explain a third operation for loading a roll medium.

FIGS. 10 to 12 illustrate an operation for loading a roll medium.

A supply device 110 according to this embodiment illustrated in FIGS. 10 to 12 differs from that in the first embodiment in that an optical reflection sensor S configured to detect a presence or absence of a sheet is provided at the arm portion 31 of the guide member 30. The sensor S emits light in a direction that intersects an imaginary line within the paper feed path 17 through which the sheet of the roll medium 1 passes from below the arm portion 31 of the guide member 30. Then, the sensor S detects a presence or absence of a sheet on the basis of a presence or absence of light reflection. In the following description, the same reference characters are attached to the same configurations as those in the first embodiment, and explanation that overlaps with the first embodiment will not be repeated.

FIG. 10 is a side cross-sectional view used to explain a first operation for loading a roll medium mounted in the lower holding unit.

As illustrated in FIG. 10, in the first operation for loading the roll medium 1, due to an urging force of a torsion spring (not illustrated), the separating flapper 14 rotates in a direction of the arrow A, and is maintained in a state where the roller 16 is in contact with the outer periphery of the roll medium 1.

Next, the roll medium 1 coupled to the drive mechanism 3 rotates in reverse in a direction of the arrow B. By rotating the roll medium 1 in reverse, the leading end of a sheet of the roll medium 1 is detected by the sensor S provided at the arm portion 31 of the guide member 30. Upon detecting the leading end of the sheet by the sensor S, the drive mechanism 3 is stopped to stop the reverse rotation of the roll medium 1.

FIG. 11 is a side cross-sectional view used to explain a second operation for loading a roll medium. As illustrated in FIG. 11, the urging force of the torsion spring (not illustrated) of the separating flapper 14 maintains a state where the roller 16 is in contact with the roll medium 1, as with the first operation for loading the roll medium 1. Then, the roll medium 1 coupled to the drive mechanism 3 is caused to rotate in a normal direction in a direction of the arrow D. In association with the rotation of the roll medium 1, the roller 16 that is in contact with the outer periphery of the roll medium 1 rotates in a follower manner.

FIG. 12 is a side cross-sectional view used to explain a third operation for loading a roll medium.

As illustrated in FIG. 12, the roll medium 1 is caused to rotate in a normal direction in a direction of the arrow D by using a drive motor (not illustrated). At this time, when the leading end of the sheet of the roll medium 1 tends to stick to the roll medium 1 due to curling tendency or static electricity or the like of the roll, the leading end of the sheet is separated from the roll medium 1 by the roller 16 of the separating flapper 14. The leading end of the sheet that has been separated from the roll medium 1 passes through the paper feed path 17 due to the weight of the sheet, and is handed over to the transport unit 70 (FIG. 2) disposed above the supply device 110.

Note that the loading operation of the supply device 110 according to the present application has been described by giving the lower holding unit 40 configured as a drawer type as an example. However, the operation for loading the roll medium 1 can be similarly applied to the upper holding unit 10 of the supply device 100 described in the first embodiment. That is, this operation can be applied to a system in which a user installs the roll medium 1 in the upper holding unit 10 directly from diagonally above.

Note that the sensor S in the second embodiment has been described by giving an optical reflection sensor as an example. However, the sensor may be a light transmission-type sensor or the like. In addition, other detection systems may be used, provided that it can detect a sheet.

As described above, with the supply device 110 according to this embodiment, it is possible to obtain the following effect.

The supply device 110 includes the optical reflection sensor S configured to detect a presence or absence of a sheet and provided at the arm portion 31 of the guide member 30. The sensor S emits light in a direction that intersects an imaginary line within the paper feed path 17 through which the sheet of the roll medium 1 passes. In addition, the sensor S detects a presence or absence of a sheet on the basis of a presence or absence of light reflection.

By performing the operation for loading the roll medium 1 using this configuration, it is possible to easily mount the roll medium 1 without concern about the leading end of the sheet of the roll medium 1.

What is claimed is:

1. A supply device for a roll medium comprising:
- a holding unit configured to support a shaft of a roll medium to hold the roll medium; and
- a guide member configured to be pressed upward from below to come into contact with the roll medium held by the holding unit is stored in a supply device main body, and be displaced in accordance with a change in an outer diameter of the roll medium, wherein
- the holding unit is configured to be drawn from the supply device main body in a first direction,
- the guide member comes into contact with an outer periphery of the roll medium when the holding unit, in a drawn-out state, is stored in the supply device main body, and the guide member is caused to be retracted downward from a travel path of the holding unit against a force pressing upward from below, and
- the shaft of the roll medium is configured to be driven by being coupled to a drive mechanism when the holding unit is in a stored state.

2. The supply device for a roll medium according to claim 1, wherein
- when a drawing direction in the first direction is set as upstream and a storage direction is set as downstream, the guide member rotates with a first rotational movement shaft disposed downstream in the first direction being a fulcrum, and is retracted.

3. The supply device for a roll medium according to claim 2, wherein
- the guide member is configured to include an arm portion and a swing portion,
- the arm portion has one end disposed downstream of the first rotational movement shaft, and
- the swing portion is provided at a side of another end of the arm portion.

4. The supply device for a roll medium according to claim 3, wherein
- the swing portion includes:
- a first roller configured to come into contact with the roll medium in a process of storing the holding unit; and at least one second roller configured to come into contact with the roll medium in the stored holding unit.

5. The supply device for a roll medium according to claim 4, wherein in the swing portion, the first roller is disposed upstream of the second roller, and in the process of storing the holding unit, comes into contact with the roll medium at a position lower than a height of the shaft of the roll medium.

6. The supply device for a roll medium according to claim 5, wherein a second rotational movement shaft is provided at the swing portion at the side of the other end of the arm portion, and the swing portion is rotatably provided with the second rotational movement shaft being a fulcrum.

7. The supply device for a roll medium according to claim 6, wherein two of the second rollers are provided, the second rotational movement shaft is disposed between the two second rollers, and in a state where the holding unit is stored, the two second rollers are in contact with an outer periphery of the roll medium.

8. The supply device for a roll medium according to claim 7, wherein the swing portion includes an urging portion configured to press downward a side, with respect to the second rotational movement shaft, of the swing portion, the side being a side at which the first roller is disposed.

9. The supply device for a roll medium according to claim 4, wherein the first roller is disposed lower than the second roller when the first roller is not in contact with the roll medium.

10. The supply device for a roll medium according to claim 1, wherein a plurality of the holding units are disposed in a vertical direction, and at least a holding unit, among the holding units, disposed lower than an uppermost stage is configured to be drawn.

11. A recording device comprising:

a supply device; and a recording unit configured to perform recording on a sheet pulled out from a roll medium, the supply device including:

a holding unit configured to support a shaft of the roll medium to hold the roll medium; and a guide member configured to be pressed upward from below to come into contact with the roll medium held by the holding unit is stored in a supply device main body, and be displaced in accordance with a change in an outer diameter of the roll medium, wherein the holding unit is configured to be drawn from the supply device main body in a first direction, the guide member comes into contact with an outer periphery of the roll medium when the holding unit, in a drawn-out state, is stored in the supply device main body, and the guide member is caused to be retracted downward from a travel path of the holding unit against a force pressing upward from below, and the shaft of the roll medium is configured to be driven by being coupled to a drive mechanism when the holding unit is in a stored state.

* * * * *